United States Patent [19]
Mellen

[11] 3,757,872
[45] Sept. 11, 1973

[54] TWO-WAY PLOW ACTUATOR LOST MOTION MECHANISM

[75] Inventor: William F. Mellen, Anaheim, Calif.

[73] Assignee: Alice Marian Mellen, Anaheim, Calif.

[22] Filed: Nov. 15, 1972

[21] Appl. No.: 306,734

Related U.S. Application Data
[63] Continuation-in-part of Ser. No. 159,116, July 2, 1971.

[52] U.S. Cl. .............................. 172/225, 172/204
[51] Int. Cl. ............................................ A01b 3/28
[58] Field of Search .................... 172/204, 212, 224, 172/225, 226

[56]  References Cited
UNITED STATES PATENTS

| | | | |
|---|---|---|---|
| 3,428,135 | 2/1969 | Richey | 172/225 |
| 3,524,509 | 8/1970 | Richey | 172/212 |
| 3,583,493 | 6/1971 | Wadelton | 172/225 |

FOREIGN PATENTS OR APPLICATIONS

| | | | |
|---|---|---|---|
| 1,111,901 | 5/1968 | Great Britain | 172/212 |

*Primary Examiner*—Edgar S. Burr
*Assistant Examiner*—Paul T. Sewell
*Attorney*—William C. Babcock

[57] ABSTRACT

A two-way plow that includes a plow assembly that may be pivoted to either a first or second operating position by a longitudinally expandable and contractable hydraulic actuator in conjunction with a lost motion mechanism. The plow includes a frame on which first and second laterally spaced rests are provided, which rests when contacted support the plow assembly slightly below the first and second operating positions.

The lost motion mechanism includes a first portion pivotally supported from the actuator and a second portion that occupies a fixed position relative to the plow assembly. The second portion includes first and second longitudinally adjustable stops.

The first and second portions are so operatively associated that the lost motion mechanism serves two functions. First, as the actuator is contracted the plow assembly will be pivoted from one operating position towards the other, and the center of weight of the plow assembly moves through dead center prior to the actuator being fully contracted. The weight of the plow assembly causes the latter to pivot by gravity towards the operating position to which it is moving after the center of weight of plow assembly has passed dead center. The rate at which the plow assembly is allowed to so pivot is determined by the rate at which the actuator is allowed to expand. The second function served by the lost motion mechanism, and that occurs when the actuator is fully extended and the first portion is in contact with one of said stops, is to support the plow assembly in either the first or second operating position without the assembly being in contact with either of said rests. Upward shock arising from movement of the plow assembly through the ground is accordingly transferred to hydraulic fluid in the actuator rather than to the plow frame, and damage to the latter is minimized.

6 Claims, 10 Drawing Figures

PATENTED SEP 11 1973 3,757,872
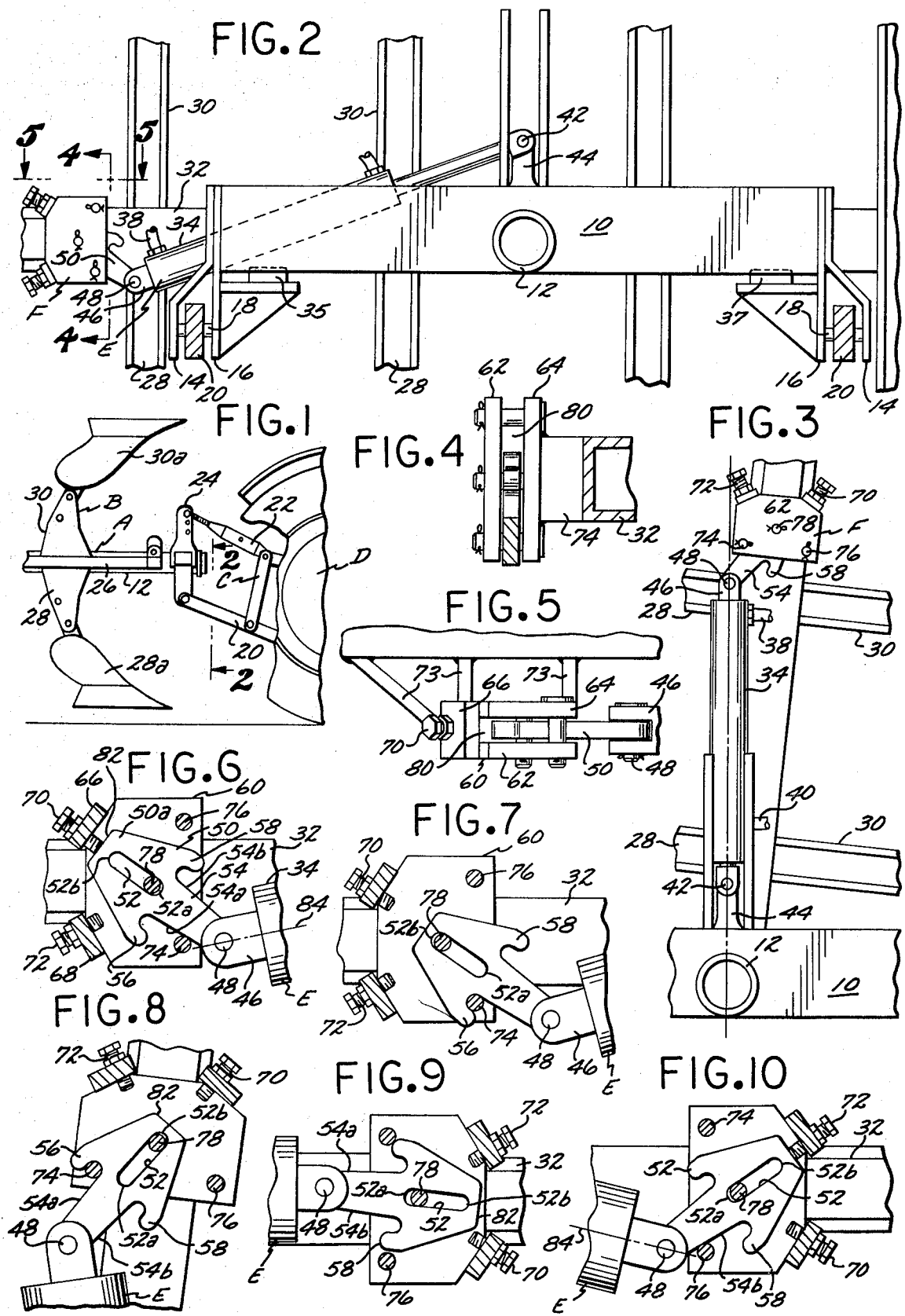

TWO-WAY PLOW ACTUATOR LOST MOTION MECHANISM

CROSS REFERENCE TO RELATED APPLICATION

This is a continuation-in-part application of application Ser. No. 159,116, filed July 2, 1971, entitled ROLL OVER PLOW.

BACKGROUND OF THE INVENTION

1. Field of the Invention

Two-way plow actuator lost motion mechanism.

2. Description of the Prior Art

In the past various types of roll over plows have been devised in which a pivotally supported plow assembly is selectively movable to either first or second operationg positions by hydraulic mechanism. However, the high magnitude forces imposed by the actuator in holding the plow assembly in an operating position is transmitted to the frame and will have a detrimental effect thereon and on associated structures.

The primary purpose in devising the present invention is to provide a two-way plow with an actuating mechanism that not only assures that the plow assembly will move past dead center when pivoting from one operating position to the other, but will so support the plow assembly when in an operating position that upward shock from the plow assembly is not transmitted to the plow frame.

SUMMARY OF THE INVENTION

A lost motion mechanism that in combination with an extendable and contractable hydraulic actuator is used to pivot a plow assembly to either a first or second operating position relative to a plow frame. The actuator has a first end pivotally supported on a fixed axis relative to the plow frame and a second end pivotally supporting a member that defines two laterally spaced hooks and has an elongate slot formed therein. The member is a part of the lost motion mechanism and includes an elongate leg that is longitudinally aligned with the slot.

The member is operatively associated with a box-shaped bracket that also forms a part of the lost motion mechanism. The bracket is rigidly secured to the plow assembly and longitudinally aligned with the member above described. The bracket supports first, second and third transverse pins that are spaced from one another, with the third pin at all times slidably and pivotally engaging the slot in the member. The bracket supports first and second spaced stops, each of which is longitudinally adjustable on the bracket.

The frame of the plow includes first and second rests which, when contacted by the plow assembly support the latter in positions slightly below that occupied when the plow assembly is in the first or second operating position.

When the plow assembly is supported on either the first or second rests, and the actuator is energized to move towards a fully extended position, the actuator pivots and slides the member to a position on the third pin where the surface of the member most remote from the leg is in abutting contact with one of the stops and a longitudinal edge of the leg is in pressure contact with either the first or second pin. Continued extension of the actuator results in the member and bracket cooperating to transmit a force to the plow assembly to pivot the latter to either a first or second operating position. When the actuator is fully extended the plow assembly is supported in either a first or second operating position clear of the first and second rests, and upwardly directed forces developed by the plow assembly as it is drawn through the ground being transmitted to hydraulic fluid in the actuator rather than to the frame of the plow.

The slotted member on opposite sides of the outwardly projecting legs defines first and second laterally spaced hooks. When it is desired to pivot the plow assembly from one operating position to the other thereof, the actuator is caused to contract, and the weight of the plow assembly causes it to pivot in a direction where for a moment it is supported on one of the rests. Continued contraction of the actuator results in either the first or second hook engaging the first or second pin, and the member, after such engagement pivoting the plow assembly towards the operating position opposite to that it previously occupied.

Prior to the actuator being fully contracted, the actuator has pivoted the plow assembly to where the center of weight thereof is past dead center. Gravity now tends to pivot the plow assembly towards an operating position, but with the direction of flow through the actuator reversed. The rate at which the plow assembly moves to an operating position is controlled by the rate at which the actuator is extended as fluid flows therefrom.

Prior to the plow assembly occupying the operating position to which it is being moved, the plow assembly will momentarily move into a position where it is supported on one of the rests. The actuator when the plow assembly is so disposed continues to expand with the slotted member being moved to an intermediate position where it exerts no force on the first or second pins or the first and second stops. Continued expansion of the actuator results in the slotted member pivoting and sliding on the third pin until the end surface of the member is in contact with one of the stops and one of the side edges of the legs in contact with either the first or second pin. Continued expansion of the actuator results in the bracket and slotted member pivoting the plow assembly upwardly to an operating position free and clear of the rests. When it is desired to pivot the plow assembly to the other of the operating positions the above-described operation is repeated, but with the direction of pivotal movement of the plow assembly being reversed.

BRIEF DESCRIPTION OF THE DRAWING

FIG. 1 is a side elevational view of the rear portion of a power vehicle that by a conventional linkage supports a rearwardly extending two-way plow;

FIG. 2 is an end elevational view of the plow taken on the line 2—2 of FIG. 1 and illustrating the hydraulic fluid-operated actuator and the lost motion mechanism;

FIG. 3 is a fragmentary and elevational view of the plow frame and with the plow assembly having been pivoted clockwise past dead center by the actuator and lost motion mechanism;

FIG. 4 is a transverse cross-sectional view of the frame and lost motion mechanism taken on the line 4—4 of FIG. 2;

FIG. 5 is a top plan view of the lost motion mechanism taken on the line 5—5 of FIG. 2;

FIG. 6 is a combined vertical cross-sectional and side elevational view of the lost motion mechanism and actuator taken on the line 6—6 of FIG. 5 when the actuator is fully extended and cooperating with the lost motion mechanism to support the plow assembly in an operating position free and clear of rests supported from the frame of the plow;

FIG. 7 is the same view shown in FIG. 6 but with the slotted member having been moved to engage one of the pins, with such movement taking place when the plow assembly is supported on one of the rests, and the slotted member now in a position to exert a force in a clockwise direction to pivot the plow assembly towards the over-center position illustrated in FIG. 3 when the actuator is contracted;

FIG. 8 is the same view as shown in FIG. 7 but with the slotted member in the position it occupies when the actuator is fully contracted and the center of weight of the plow assembly has been moved to the right as viewed in this figure to an over-center position, with gravity thereafter tending to pivot the plow assembly to a position where it is supported on the right hand rest shown in FIG. 2, and the rate at which such gravity-motivated pivotal movement occurs being controlled by the rate at which the actuator is allowed to expand;

FIG. 9 is the same view as shown in FIG. 8 that is taken after the plow assembly has pivoted to the right to be supported on the right hand rest, and with the actuator thereafter being continued to expand to dispose the slotted member in a position where it exerts no force on the stops or the second and third pins; and FIG. 10 is the same view as shown in FIG. 9 after the actuator is further expanded to pivot the slotted member to a position where it exerts an upward force on one of the stops sufficient to support the plow assembly in an operating position above the right hand rest illustrated in FIG. 2, and with the actuator fully expanded.

DESCRIPTION OF THE PREFERRED EMBODIMENT

The two-way plow A shown in the drawings includes a cross piece 10 illustrated in FIG. 2 from which a heavy elongate member 12 extends rearwardly to pivotally support a plow assembly B. The cross piece 10 has two pairs of laterally spaced legs 14 and 16 extending downwardly from the ends thereof. Each pair of legs 14 and 16 supports a pin 18 therebetween. The pins 18 are pivotally engaged by rearwardly extending members 20 that form a part of a conventional link plow connection C that extends rearwardly from a power operated vehicle D, such as a tractor or the like. The link plow connection C also includes members 22 that are connected to legs 24 that extend upwardly from the cross piece 10.

The plow assembly B, as shown in FIGS. 1 and 2, includes a rearwardly extending beam 26 that has a sequence of first and second arms 28 and 30 extending therefrom in opposite directions that support first and second plow bottoms 28a and 30a. The beam 26 is pivotally supported from member 12 by forward and rearward cross members 32, but with only the forward cross member being shown in the drawings in FIG. 2.

The plow assembly B is capable of being pivoted on the member 12 to have either the first or second plow bottoms 28a and 30a disposed in first or second operating positions. First and second rests 35 and 37 are supported from legs 16, with the rests being engaged by the plow assembly B when it is pivoted to slightly below the first and second operating positions.

An actuator E is provided that is longitudinally expandable and contractable and is defined by first and second elements. The first element is illustrated in FIG. 2 as a hydraulic cylinder 34 in which a piston rod 36 is slidably movable, the piston rod comprising the second element. The interior ends of cylinder 34 may have hydraulic fluid discharged thereinto or therefrom through two conduits 38 and 40 that extend to a valve controlled source of fluid under pressure (not shown). Piston rod 36 has the outer end thereof pivotally connected by a pin 42 to an upright 44 that is secured to member 12.

The cylinder 34 is tranversely positioned as shown in FIG. 2 and has a bifurcated end 46 that by a pin 48 is pivotally connected to a slotted member 50 that forms a part of the lost motion mechanism, shown in FIG. 2 and FIGS. 6 through 10. Member 50 is preferably formed from heavy steel plate and is in the general form of a truncated arrowhead.

Member 50, as shown in FIGS. 6 through 10, includes a portion 50a in which an elongate slot 52 is formed that is longitudinally aligned with an outwardly extending leg 54. The outer end of leg 54 is pivotally engaged by pin 48. Slot 52 has first and second ends 52a and 52b, respectively. Member portion 50a, in cooperation with leg 54, defines first and second hooks 56 and 58, as shown in FIGS. 6 through 10.

A box-like bracket 60 forms a second part of the lost motion mechanism F and includes first and second laterally spaced side walls 62 and 64 that are joined by first and second cross pieces 66 and 68, which cross pieces support first and second longitudinally adjustable stops 70 and 72. Bracket 60 is supported from cross member 32 by a number of lugs 73, as shown in FIGS. 4 and 5. First, second and third pins 74, 76 and 78 extend in spaced relationship between sidewalls 62 and 64. Slot 52 is at all times in slidable and pivotal engagement with third pin 78. The member 50, as may be seen in FIGS. 4 through 10, is at all times at least partially within the confines of a space 80 defined between side walls 62 and 64.

When the plow assembly B is in a first operating position, as shown in FIG. 2, the lost motion mechanism F occupies the position illustrated in FIG. 6. The actuator E is fully extended and is forcing the truncated end surface 82 of member 50 into pressure contact with first stop 70, in the position shown in FIG. 6, and first longitudinal edge 54a of leg 54 into pressure contact with first pin 74, with the third pin 78 being disposed adjacent the first end 52a of slot 52. The longitudinal axis 84 of movement of actuator E is below the point of contact of first pin 74 and edge 54a, and as a result the force exerted by the actuator tends to move the lostmotion mechanism and the plow assembly B to which it is attached upwardly prior to the actuator becoming fully extended. The stop 70 is manually adjusted to a position that when the actuator E is fully extended the plow assembly B will be in a first operating position, as shown in FIG. 6, where it is not in contact with the first rest 35. Upward shock developed by the plow assembly B as it is drawn through the ground when the plow assembly is in the first operating position will be transmitted completely to the hydraulic fluid (not shown) in actuator E and not to the structure defining the plow A.

When it is desired to pivot the plow assembly B from a first to a second operating position, contraction of the actuator E is initiated The weight of plow assembly B momentarily causes it to be supported on first rest 35. As contraction of the actuator E takes place, the weight of the actuator tends to cause it to pivot downwardly, with the member 50 moving to the position shown in FIG. 7, where the first hook 56 engages the first pin 74.

Contraction of the actuator E now results in a force being impressed on the member 50 in a direction to pivot the plow assembly B upwardly from contact with first rest 35. Due to the angular positioning of member 50 relative to bracket 60, the center of weight of plow assembly B moves to the right through dead center, as viewed in FIG. 3, prior to the actuator being fully contracted. The weight of the plow assembly B now tends to pivot the plow assembly from the position shown in FIGS. 3 and 8 to the second operating position. The rate at which the plow assembly B is allowed to pivot due to gravity from the position shown in FIG. 3 to the second operating position is controlled by the rate at which hydraulic fluid is allowed to flow from the actuator E.

The weight of the plow assembly B will initially move it to a position where it rests on the second rest 37. Continued expansion of the actuator E causes the member 50 to move to a position, as shown in FIG. 9, where member 50 is not in pressure contact with the second or third pins 74 and 76, or first and second stops 70 and 72. When the actuator E is extended to the degree that the member 50 is clear of pins 74 and 76, the weight of the actuator pivots the member 50 to bring the edge 54b in pressure contact with second pin 76. Continued expansion of the actuator E now results in the member pivoting to the position shown in FIG. 10. The force exerted by the actuator E along the axis 84 is in a direction to pivot the plow assembly B upwardly from contact with rest 37 to the second plowing position. The actuator E is fully extended when the plow assembly is in the second operating position. When it is desired to pivot the plow assembly B from the second to the first operating position the operation above described is repeated, but with the plow assembly pivoting in a reverse direction.

The use and operation of the invention has been described previously in detail and need not be repeated.

I claim:

1. In combination with a two-way plow of the type that includes a frame having a forwardly disposed crosspiece and an elongate member extending rearwardly from said crosspiece, a plow assembly pivotally supported from said elongate member, said plow assembly capable of plowing in either first or second operating positions that are located on opposite sides of said elongate member, first and second transversely disposed rests that are situated on opposite sides of said elongate member and that maintain said plow assembly slightly below said first and second operating positions when said plow assembly is supported on said rests, a power operated lost motion mechanism for selectively pivoting said plow assembly to either said first or second operating positions, said power operated lost motion mechanism including:

a. a hydraulic fluid-operated elongate acutator that has first and second elements thay may be expanded and contracted relative to one another, said first element pivotally supported from said frame to permit transverse swinging movement of said actuator relative to said elongate member;

b. a first portion of a lost motion mechanism pivotally supported from said second element of said actuator;

c. a second portion of a lost motion mechanism rigidly secured to said plow assembly that is slidably and pivotally engaged by said first portion, said first and second portions interlocking when said plow assembly is supported on either said first or second rest and contraction of said actuator is initiated, when said first and second portions remaining so interlocked relative to one another as to pivot the center of weight of said plow assembly through dead center prior to maximum contraction of said actuator being attained, and gravity, after said center of weight has passed through said dead center, pivoting said plow assembly towards the one of said rests opposite that from which said plow assembly has moved, with the rate at which said plow assembly is pivoted by gravity being controlled by the rate at which said actuator is allowed to expand; and d. first and second spaced stops on said second portion of said lost motion mechanism that are pressure contacted by said first portion when said plow assembly is supported on said first or second rest and further expansion of said actuator is effected, with said plow assembly being pivoted upwardy from said first or second rest to said first or second operating position when said actuator is fully extended, and said first portion moving to interlock with said second portion after said actuator is initially contracted to allow said plow assembly to pivot from said first or second operating position to be supported on said first or second rest, with said first portion thereafter completely interlocking with said second portion by further contracting said actuator, and said power-operated lost motion mechanism when said plow assembly is in either said first or second operating position serving to transmit upward shock from said plow assembly as it is drawn through the ground to hydraulic fluid in said actuator rather than to said frame.

2. The combination as defined in claim 1 in which said first portion of said lost motion mechanism is a sloted plate that has an end surface that can pressure contact either of said first or second stops, with said plate defining first and second engaging means, and said second portion includes:

e. a bracket mounted in a fixed position on said plow assembly, said bracket defining a confined space in which said plate is movable, and said bracket supporting said first and second stops; and f. first, second and third spaced pins supported by said bracket and extending across said space, said third pin at all times in slidable and pivotal engagement with said slotted plate, said first and second engaging means being in engagement with one of said first and second pins when said plow assembly is pivoted from said first rest to said second rest and from said second rest to said first rest, and said end surface in pressure contact with said first stop when said plow assembly is pivoted from a position where it is supported on said first rest to said first operating position, and said end surface in pressure contact with said second stop when said plow assembly is pivoted from a position where it is supported on said second rest to said second operating position.

3. The combination as defined in claim 2 in which said first and second stops are longitudinally adjustable relative to said bracket.

4. The combination as defined in claim 2 in which said slotted plate is in the general form of a truncated arrowhead, said slotted plate including a first portion in which an elongate slot is formed that is at all times in movable engagement with said third pin, said slotted plate including a leg that extends outwardly from said first portion and is substantially normal to said end surface, said leg having first and second longitudinal sides, with said end surface being in pressure contact with said first stop and a portion of said first side bearing against said first pin when said plow assembly is in said first operating position, and said end surface in pressure contact with said second stop and a portion of said second side bearing against said second pin when said plow assembly is in said second operating position.

5. The combination as defined in claim 4 in which said slot is longitudinally aligned with said leg.

6. The combination as defined in claim 2 in which said first and second engaging means are first and second hooks.

* * * * *